United States Patent
Chandhoke

(10) Patent No.: US 9,285,801 B2
(45) Date of Patent: Mar. 15, 2016

(54) AUTOMATIC GENERATION OF A MOTION CONTROLLER

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 2069 days.

(21) Appl. No.: 11/226,863

(22) Filed: Sep. 14, 2005

(65) Prior Publication Data

US 2006/0064183 A1    Mar. 23, 2006

Related U.S. Application Data

(60) Provisional application No. 60/609,616, filed on Sep. 14, 2004.

(51) Int. Cl.
     *G05B 11/01*      (2006.01)
     *G05B 19/418*      (2006.01)

(52) U.S. Cl.
     CPC ....... *G05B 19/41845* (2013.01); *G05B 2219/33114* (2013.01); *G05B 2219/34216* (2013.01); *G05B 2219/36016* (2013.01); *G05B 2219/36231* (2013.01)

(58) Field of Classification Search
     CPC ........................................................ G05B 11/01
     USPC ................. 700/86, 18, 87, 900; 715/771, 772
     See application file for complete search history.

(56) References Cited

U.S. PATENT DOCUMENTS

| | | | |
|---|---|---|---|
| 5,499,374 A * | 3/1996 | Di Giulio et al. | 710/240 |
| 6,128,545 A | 10/2000 | Miller | |
| 6,259,221 B1 * | 7/2001 | Yutkowitz | 318/561 |
| 6,473,660 B1 * | 10/2002 | Thibault | 700/79 |
| 6,714,201 B1 * | 3/2004 | Grinstein et al. | 345/474 |
| 6,788,980 B1 * | 9/2004 | Johnson | 700/1 |
| 7,000,191 B2 | 2/2006 | Schmitt et al. | |
| 2001/0020291 A1 | 9/2001 | Kudukoli et al. | |
| 2001/0034879 A1 | 10/2001 | Washington et al. | |
| 2002/0129333 A1 | 9/2002 | Chandhoke et al. | |
| 2002/0186245 A1 * | 12/2002 | Chandhoke et al. | 345/764 |
| 2002/0191023 A1 | 12/2002 | Chandhoke et al. | |
| 2004/0083456 A1 | 4/2004 | Cornett et al. | |
| 2004/0230553 A1 * | 11/2004 | Makowski et al. | 707/1 |
| 2005/0049724 A1 | 3/2005 | Chandhoke et al. | |

OTHER PUBLICATIONS

U.S. Appl. No. 09/518,492 titled "System and Method for Programmatically Creating a Graphical Program", filed Mar. 3, 2000, whose inventors are Ram Kudukoli, Robert Dye, Melanie Jensen and Yumiko Kawachi.

(Continued)

*Primary Examiner* — Tejal Gami
(74) *Attorney, Agent, or Firm* — Meyertons Hood Kivlin Kowert & Goetzel, P.C.; Jeffrey C. Hood

(57) ABSTRACT

A method for automatically creating a customized motion controller based on user input specifying desired characteristics of the motion controller. The method may compile the program into executable code and download the executable code to a target platform, thus enabling the target platform to function as the specified customized motion controller. User input may specify characteristics of the motion controller system such as: the target platform; the configuration of motors, sensors and I/O devices to be used; the supervisory control functions to be implemented; and the target language for the motion control program.

20 Claims, 6 Drawing Sheets

(56) References Cited

OTHER PUBLICATIONS

"Best Practices for Selection of Performance Driven Motion Control Solutions"; ARC Brief; ARC Advisory Group; Oct. 2004; 16 pages; Retrieved from the Internet: http://www.motioneng.com/pdf/ARC_MEI_SynqNet.pdf.

* cited by examiner

AUTOMATIC GENERATION OF A MOTION CONTROLLER

PRIORITY CLAIM

This application claims the benefit of U.S. Provisional Application No. 60/609,616 filed on Sep. 14, 2004, entitled "Programmatic Generation of a Motion Controller", which is hereby incorporated by reference in its entirety as though fully and completely set forth herein.

BACKGROUND OF THE INVENTION

1. Field of the Invention

This invention relates to motion controllers, and more particularly, to software tools allowing users to create motion control programs having user-specified structure and functionality.

2. Description of the Related Art

Dedicated motion control boards are available for performing motion control functions, thus liberating host computers from the effort of performing these functions. A dedicated motion control board is typically configured to connect to: a host computer, one or more motor drive units, and sensor devices that report the state (e.g., position or velocity) of the motors. Motor drive units are used to provide drive signals with sufficient voltage and current to operate the stepper and/or servo motors. Dedicated motion control boards are generally not designed for user-programmability, and thus, are fixed in their motion control architecture and components. A dedicated motion control board may allow a user to change the values of parameters and set bits to turn various features ON or OFF. However, the inability to reprogram the motion control architecture or components is a severe limitation to the usefulness and cost effectiveness of dedicated motion control boards. A motion control system capable of performing motion control in a manner that is user programmable would be beneficial.

In the prior art, a motion control program may be constructed manually by the user in a graphical programming environment such as LabVIEW or in a text-based programming environment.

In a graphical programming environment, the user may construct the motion control program by:
  (a) manually selecting icons representing functions, program control structures (such a conditional structures or looping structures), data structures, input signals and output signals,
  (b) manually placing the icons at desired locations in a graphical window, and
  (c) manually coupling the icons together to form a diagram.

The diagram is the motion control program. The diagram may be compiled to form the motion control code.

In a text-based programming environment, the user may construct the motion control program by manually composing a text file (or a set of text files) containing statements conforming to a programming language. In particular, the text file may include calls to routines in one or more predefined libraries. The routines in the predefined libraries allow the user to invoke various functions associated with supervisory control, trajectory generation, and control loop processing. A variety of embodiments are contemplated in order to support a corresponding variety of programming languages such as C, C++, Java, etc.

However, many persons may not be sufficiently trained in the art of programming within one of the supported programming environments to successfully (or efficiently) complete the construction of the motion control program. Therefore, an improved method is desired for creating a motion controller that does not require manual coding of the motion controller.

SUMMARY

A motion control system may include a host computer, a hardware platform, motor drive units, sensors, and a set of I/O devices. A user programmable motion control system may be created as follows. A host computer may receive user input specifying desired characteristics, features, functions, system components, and the desired motions of a physical system to be controlled by the motion controller. The desired characteristics specified by the user input may include supervisory control functions, trajectory generation functions and loop processing functions. The host computer may then generate a program that realizes the desired characteristics based on the user input. The host computer may also compile the program into executable code in response to a user request for compilation. The host computer may download the executable code to the hardware platform and invoke execution of the executable code on the hardware platform in response to user requests for download and execution.

In some embodiments, a method for programmatically generating a motion controller may include the steps of: (a) receiving information from a user regarding characteristics of a desired motion controller; and (b) generating a program, where the program is executable to implement the motion controller according to said characteristics, where the program is programmatically generated without direct user coding of the program.

The information from the user regarding characteristics of the motion controller may include at least one of: platform type; axes type; motion I/O devices (i.e., motors and sensors); functionality; and additional I/O devices.

In one set of embodiments, the host computer may receive user inputs specifying a motion control program, download executable code corresponding to the motion control program to a target platform, and invoke execution of the executable code on the target platform. The target platform operates as a motion controller by executing the executable code.

The host computer may manage a graphical user interface through which the user may construct a diagram by selecting icons, placing the icons in a graphical window and coupling the icons together with virtual wire connections. The user inputs are inputs defining the diagram.

Alternatively, the host computer may manage a graphical user interface through which the user may construct a text file by entering textual statements conforming to a programming language. In this case, the user inputs are inputs defining contents of the text file.

BRIEF DESCRIPTION OF THE DRAWINGS

Other aspects of the invention will become apparent upon reading the following detailed description and upon reference to the accompanying drawings in which.

Figure 1:
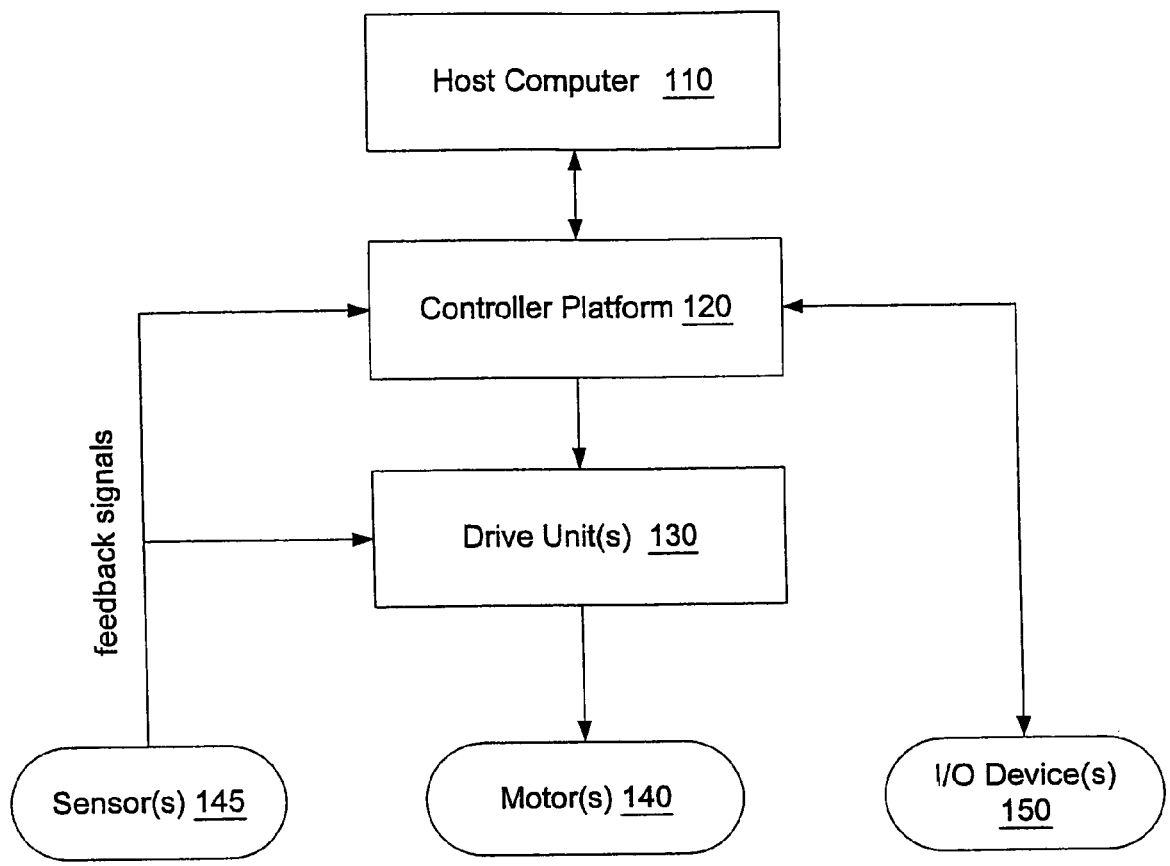
FIG. 1 illustrates one embodiment of a motion control system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION OF THE DRAWINGS

The following patent applications are hereby incorporated by reference in their entirety as though fully and completely set forth herein:

U.S. patent application Ser. No. 09/518,492 titled "System and Method for Programmatically Creating a Graphical Program" and filed on Mar. 3, 2000, whose inventors are Ram Kudukoli, Robert Dye, Melanie Jensen and Yumiko Kawachi.

U.S. patent application Ser. No. 09/745,023 titled "System and Method for Programmatically Generating a Graphical Program in Response to Program Information", filed on Dec. 20, 2000, invented by Kudukoli et al., is.

U.S. patent application Ser. No. 09/886,455 titled "System and Method for Programmatically Generating a Graphical Program in Response to User Input", filed on Jun. 20, 2001, invented by Washington, et al.

U.S. Patent Application publication number 20020129333, U.S. patent application Ser. No. 10/051,268 titled "System and Method for Programmatically Generating a Graphical Program Based on a Sequence of Motion Control, Machine Vision, and Data Acquisition (DAQ) Operations", filed on Jan. 18, 2002, and invented by Chandhoke et al.

U.S. Patent Application Publication Number 20050049724, U.S. patent application Ser. No. 10/653,532 titled "Re-configurable Motion Controller Drive", filed on Sep. 2, 2003, invented by Chandhoke et al.

U.S. Patent Application Publication Number 20020191023, U.S. patent application Ser. No. 10/051,474, titled "System And Method For Graphically Creating A Sequence Of Motion Control Operations" published on Dec. 19, 2002 and filed on Jan. 18, 2002, invented by Chandhoke et al.

A motion control system may include a host computer 110, a controller platform 120, one or more drive units 130, one or more motors 140, one or more sensors 145, and one or more I/O devices 150 as suggested in FIG. 1.

The controller platform 120 may be connected to or in communication with the host computer 110, the drive units 130, the sensors 145 and the I/O devices 150.

The drive units 130 may be configured to provide drive signals to the motors 140 in response to signals received from the controller platform 120 and sensors 145.

Motors 140 may include any combination of stepper motors and/or servo motors.

Sensors 145 may provide feedback signals to the controller platform 120 about the state of the motors and/or of the physical systems driven by the motors. For example, sensors 145 may provide measurements of the angular position (or velocity) of each motor and/or measurements of the linear position (or velocity) of the physical systems driven by the motors. Sensors 145 may include quadrature encoders.

The feedback signals (or some subset of the feedback signals) may also be provided to the drive units 130.

Figure 2:
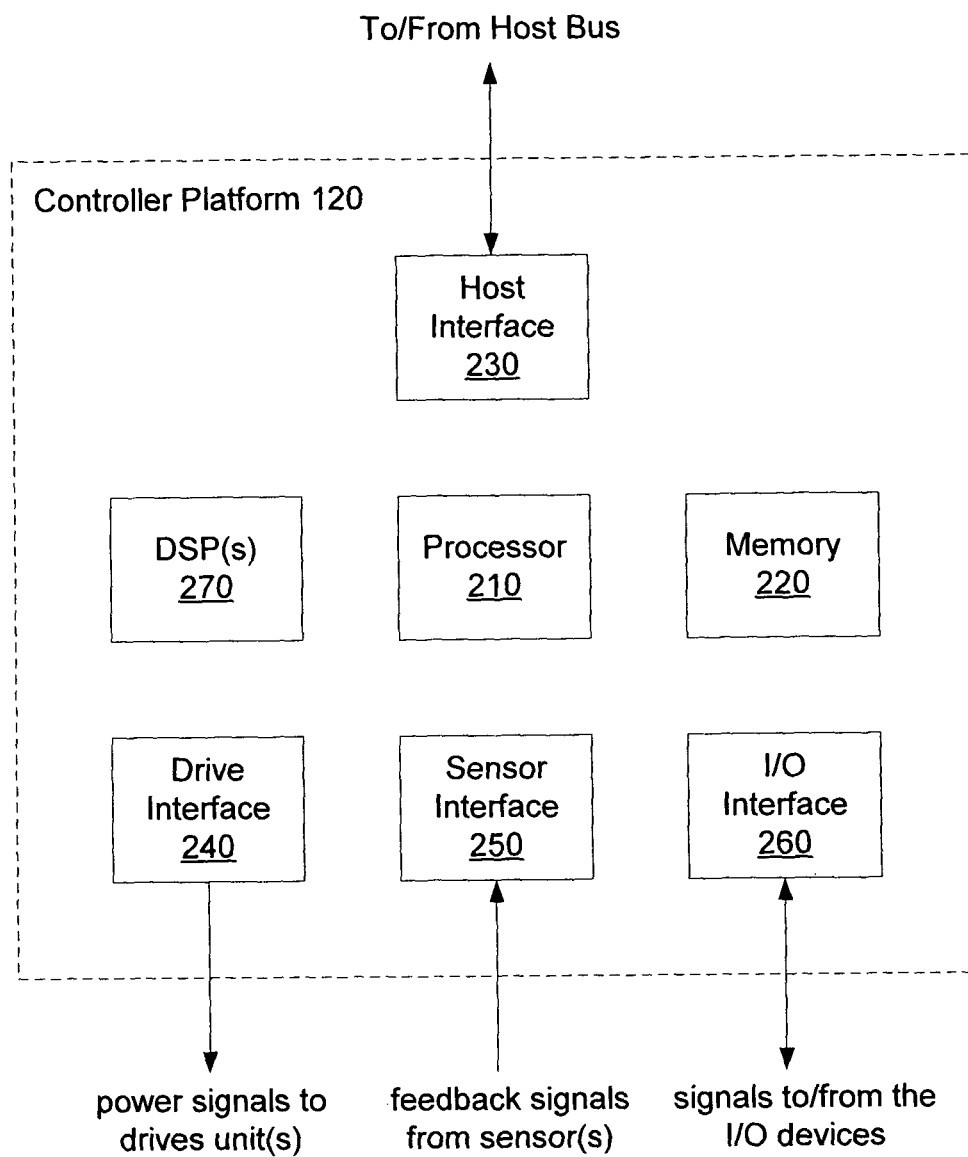
FIG. 2 is a block diagram for one embodiment of the controller platform.

The controller platform 120 may include a processor 210, memory 220, host interface 230, drive interface 240, sensor interface 250 and I/O interface 260 as illustrated in FIG. 2. The memory 220 may include any of various kinds of RAM and any of various kinds of ROM. The processor 210 is configured to execute programs stored in the memory 220. The programs may include a real-time operating system and motion control code. By executing the motion control code, the processor 210 causes the controller platform 120 to serve the function of a motion controller.

The sensor interface 250 may include analog-to-digital (A/D) converters to support the use of analog sensors.

The I/O interface 260 may include A/D converters and digital-to-analog (D/A) converters to support the use of analog input and output devices respectively.

The controller platform 120 may also include one or more digital signal processors (DSPs) 270, i.e., integrated circuits specialized for performing signal processing computations. In this case, the motion control code may include code executable by the processor 210 and code executable by the one or more DSPs.

In some embodiments, the controller platform 120 may include a field programmable gate array (FPGA). In these embodiments, at least a portion of the motion control code may be downloaded to the FPGA to provide the FPGA with at least some motion controller intelligence.

The controller platform 120 may be realized by any of various systems or devices. For example, in one set of embodiments, the controller platform 120 may be any one of the following hardware platforms developed and marketed by National Instruments Corporation:

PCI eXtensions for Instrumentation (PXI),
Compact Vision System (CVS),
Compact Field Point (CFP) or
Compact Reconfigurable I/O(CRIO).

In one embodiment of the motion control system, the host computer 110 couples to the drive units 130 without an intervening controller platform, i.e., controller platform 120 is omitted. In this case, the host computer 110 performs the motion control function.

The I/O devices 150 may include input devices, output devices, and devices capable of both input and output. The identity of the I/O devices 150 will depend on the physical systems being controlled and the application the user intends to realize. The I/O devices 130 may include digital and/or analog devices.

Figure 3:
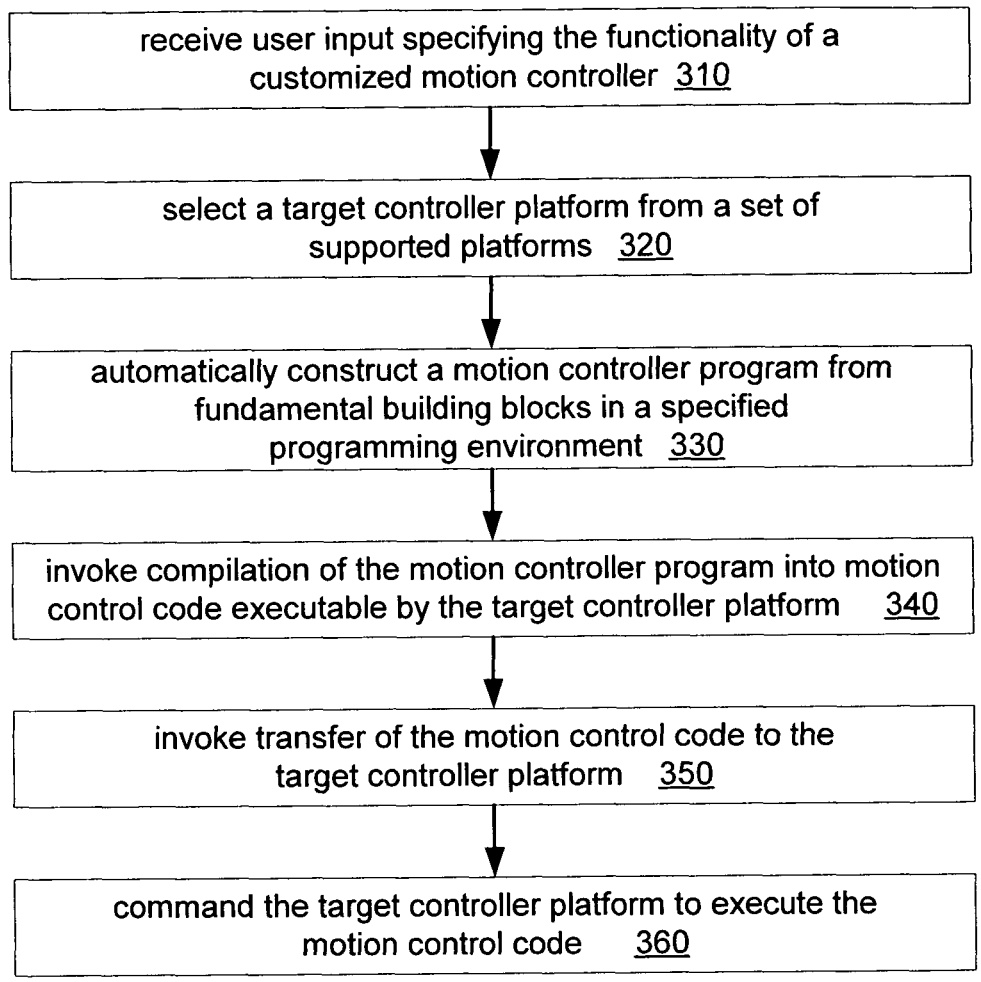
FIG. 3 illustrates one embodiment of a method for configuring a motion control system with custom designed motion control code.

As illustrated in FIG. 3, the host computer executes software that is operable to receive high level user input specifying desired functionality of a motion controller. The high level user input may include information indicating desired functionality of the motion controller, as discussed in greater detail below (as indicated in step 310). The high level user input may also include selecting a target controller platform from a set of supported platforms (as indicated in step 320).

In response to the high level user input, the software operates to automatically construct a motion controller program from fundamental functional units (as indicated in step 330). The motion controller may be automatically constructed in a graphical programming environment such as LabVIEW or in a text-based programming environment such as C, C++ or Java.

The user and/or the software program may then operate to:
(a) invoke the compilation of the motion controller program into motion control code executable by the target controller platform (as indicated in step 340);

(b) invoke transfer of the motion control code to the target controller platform (as indicated in step 350), and (c) command the target controller platform to execute the motion control code (as indicated in step 360).

In response to execution of the motion control code, the target controller platform functions as a motion controller.

In one set of embodiments, the set of supported platforms includes the National Instruments platforms listed above.

In some embodiments, the set of supported platforms may include the host computer itself. If the host computer is selected as the target controller platform, it is assumed that the host computer 110 couples to the drive unit 130 without an external controller platform intervening. Thus, the motion control program is compiled into motion control code for execution by the host computer 110.

The motion control program may include modules for supervisory control, trajectory generation and control loop processing. The functionality of each of these modules may be defined by the user in the programming environment.

Figure 4:
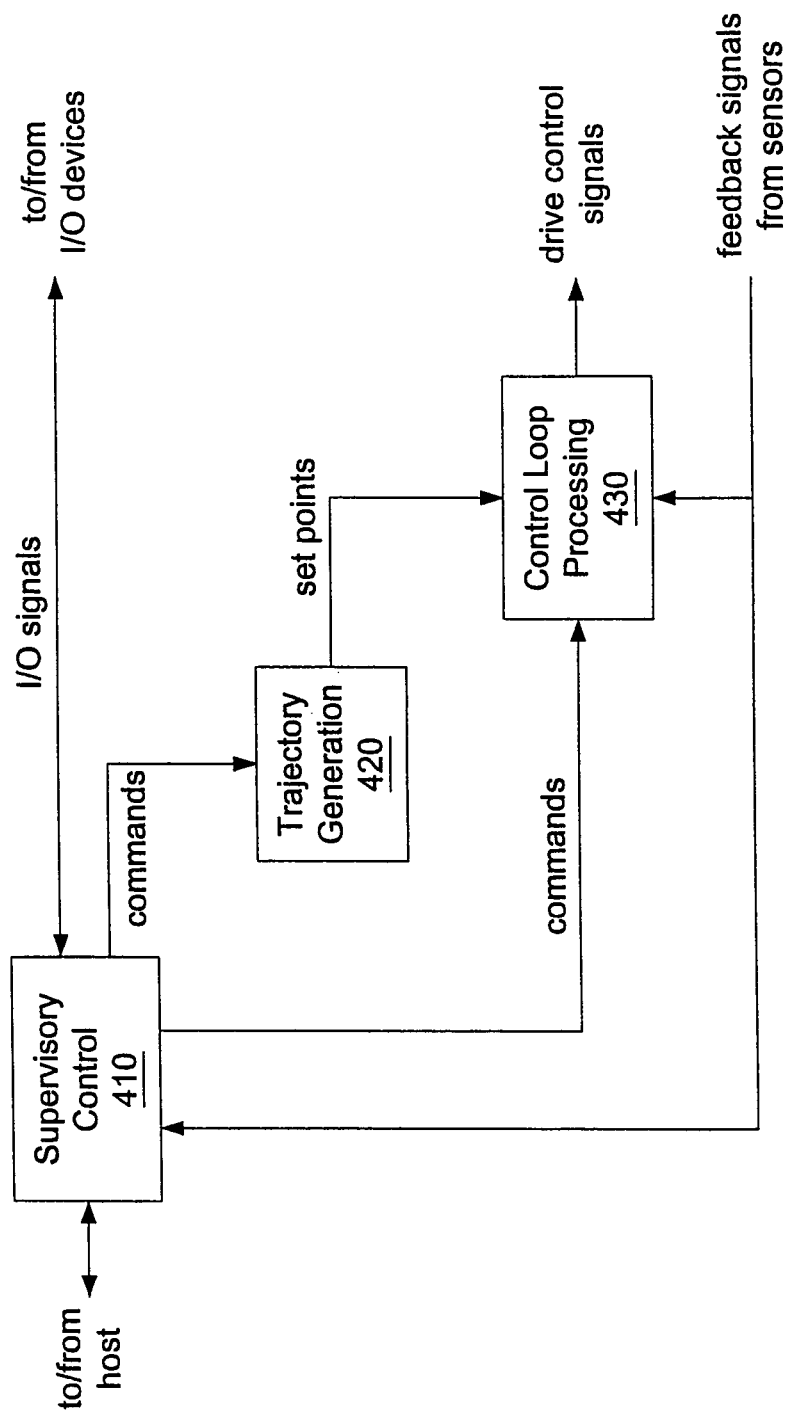
FIG. 4 illustrates one embodiment of a software architecture for the motion control program.

FIG. 4 illustrates one embodiment of the software architecture of the motion control program that may be automatically created as described herein. The supervisory control module 410 may perform user-specified functions including system initialization (e.g., homing), event handling (e.g., synchronization) and fault detection (e.g., detection of limits, E-Stop and drive faults). The supervisory control module 410 may communicate with the host computer through host interface 230 and interact with I/O devices 150 through I/O interface 260. Furthermore, supervisory control module 410 may (1) generate commands that govern the trajectory generation module 420, (2) generate commands that govern the control loop processing module 430, and (3) receive feedback signal data from sensors 145 (or derived from signals supplied by the sensors 145).

The trajectory generation module 420 may generate points along one or more user-specified trajectories in response to trajectory control commands asserted by the supervisory control module 410.

The control loop processing module 430 generates control signals for the drive units 130 based on (a) command signals asserted by supervisory control module 410, (b) a stream of set points generated by the trajectory generation module 420, and (c) feedback signal data from sensors 145 (or derived from signals supplied by the sensors 145).

As noted above, many persons may not be sufficiently trained in the art of programming within one of the supported programming environments to successfully (or efficiently) complete the construction of the motion control program. Furthermore, even if a person is sufficiently trained, he/she may not desire to expend the time required to construct the motion control program. Thus, in one set of embodiments, the host computer 110 may be configured to execute a software assistant that automates the process of constructing the motion control program. The software assistant is designed to perform automatic creation of the customized motion control program, without requiring the above prior art manual user input that has been traditionally required to create a program.

Figure 5:
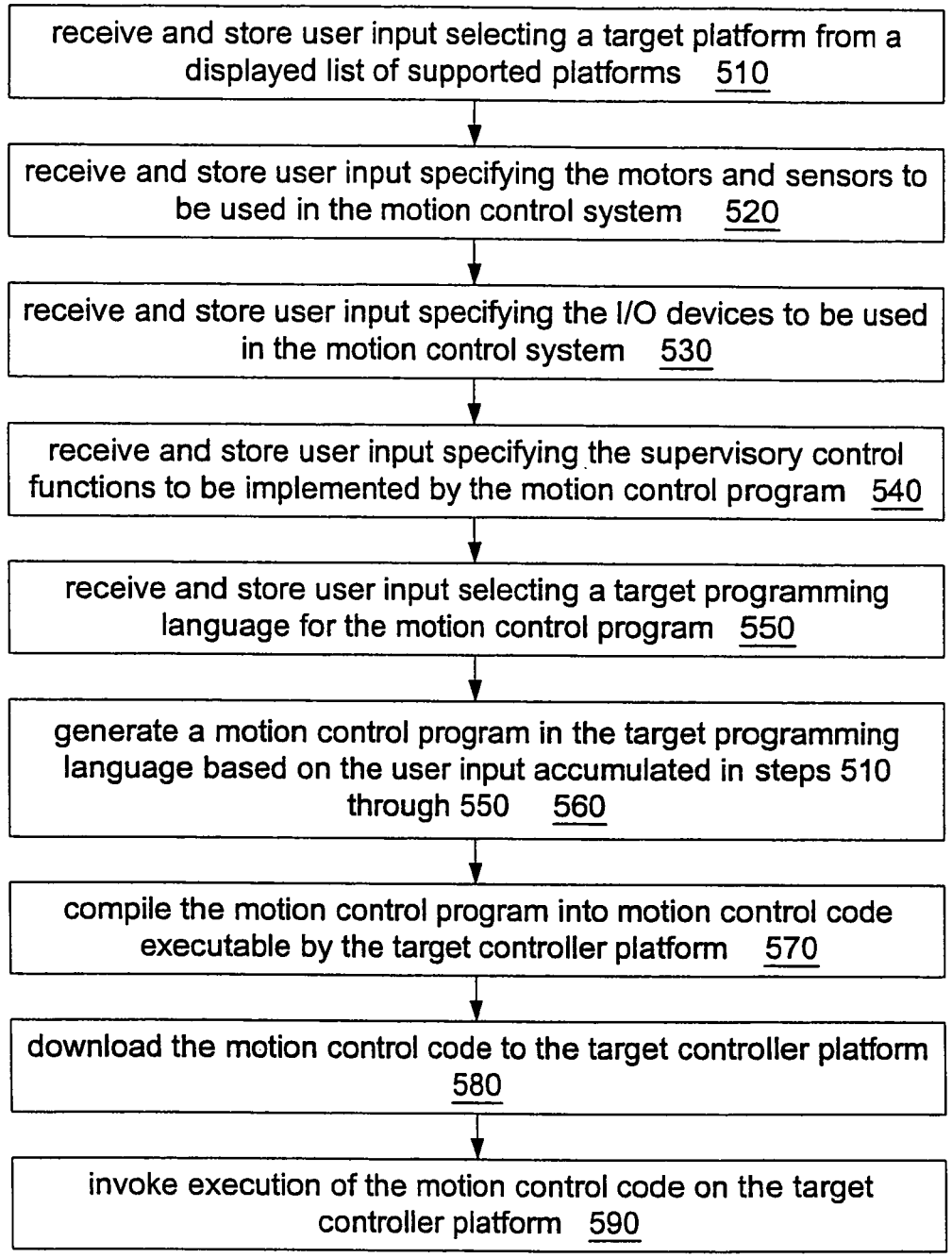
FIG. 5 illustrates one embodiment of a method for automating the task of generating a motion control program for a motion control system.

In response to execution of the software assistant, the host computer 110 may perform the following steps as illustrated in FIG. 5.

In steps 510-550 the host computer 110 (e.g, software executing on the host computer 110) operates to receive user input specifying desired functionality and/or capabilities of the motion control program (or motion controller). For example, the software may present a graphical user interface (GUI) that guides the user in entering information that specifies desired capabilities of the motion control program.

In step 510, the host computer 110 receives and stores user input selecting a target platform from a displayed list of supported platforms (such as PXI, CVS, CFP or CRIO).

In step 520, the host computer 110 receives and stores user input specifying the motors and sensors to be used in the motion control system. For example, the user input may represent selections from a first displayed list of supported motors and a second displayed list of supported sensors. As another example, the user input may specify a set of electrical characteristics for each motor and each sensor.

In step 530, the host computer 110 receives and stores user input specifying the I/O devices to be used in the motion control system. For example, the user input may represent selections from displayed lists of supported I/O devices according to their various kinds. As another example, the user input may specify a set of electrical characteristics for each I/O device.

In step 540, the host computer 110 receives and stores user input selecting the supervisory control functions to be implemented by the motion control program. For example, the user input may specify selections from displayed lists of supervisory control functions.

In step 550, the host computer 110 receives and stores user input selecting a target programming language (from a displayed list of supported languages) for the motion control program. In one embodiment, the supported languages include LabVIEW, C++, CVI and .NET.

Note that there is considerable flexibility in the order of input steps 510 through 550 and the order indicated by FIG. 5 is suggestive not mandatory.

In step 560, the host computer 110 or software automatically generates a motion control program in the target programming language based on the user input received in steps 510 through 550. The program generation step 560 may involve (a) selecting subprograms from predefined libraries based on the user inputs and (b) integrating the selected subprograms to form the motion control program. Note that the term "automatically" as used herein refers to a software program creating the motion control program based on high level user input such as that received in steps 510 through 550. In other words, the term "automatically" as used herein does not include the type of manual creation of a program, such as manual selection and manual interconnection of blocks to create a graphical program, or manual entry of textual code, as in the prior art. Rather, the automatic creation of the motion control program may in one embodiment only require the user to provide high level information regarding desired functionality and capabilities, and does not require the user to provide manual or direct user input to actually specify (or code) the code of the motion control program. For more information on automatic creation of programs, please see the applications incorporated by reference above.

In step 570, the host computer 110 compiles the motion control program into motion control code executable by the target controller platform.

In step 580, the host computer 110 downloads the motion control code to the target controller platform.

In step 590, the host computer 110 may invoke execution of the motion control code on the target controller platform.

Figure 6:
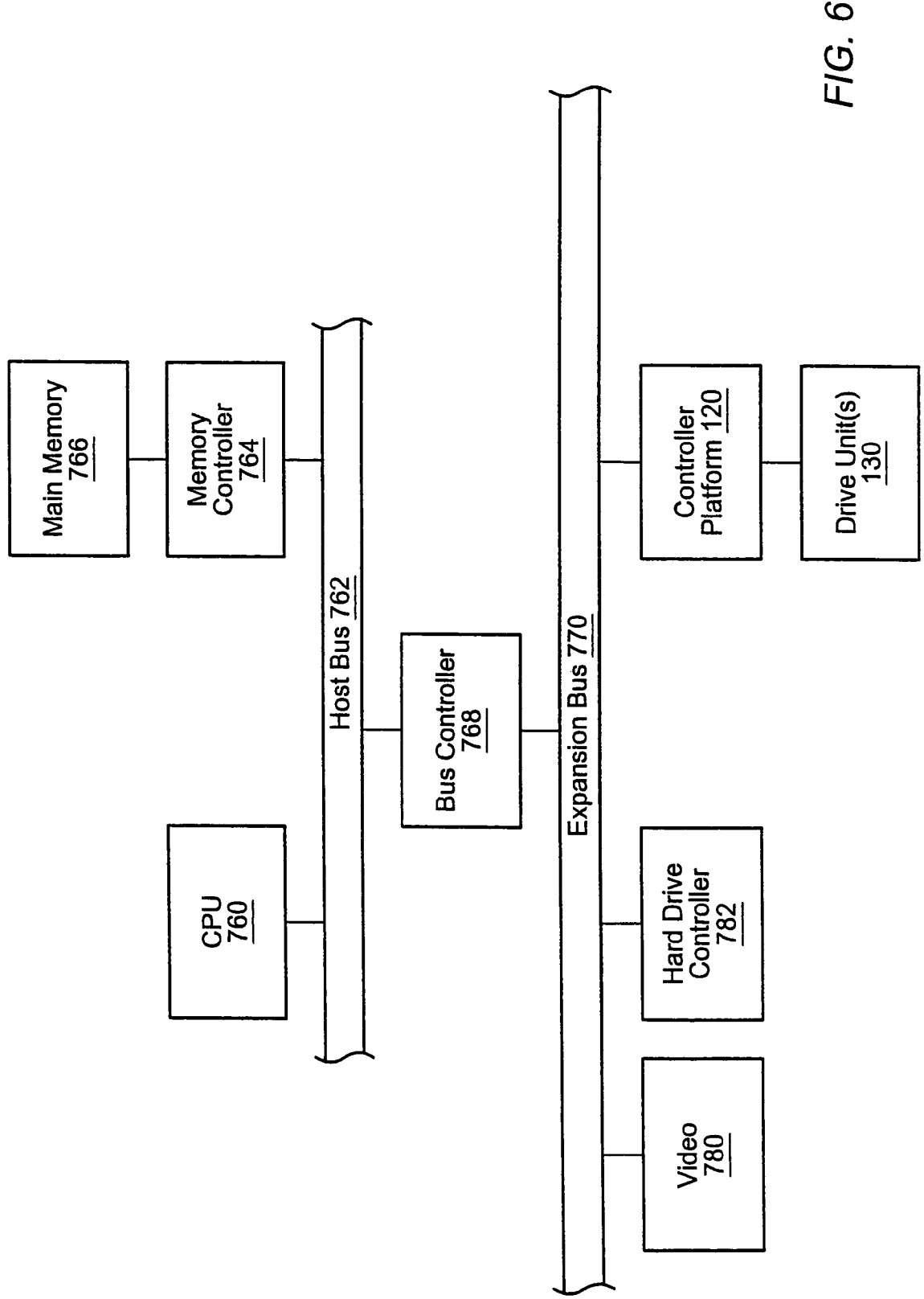
FIG. 6 illustrates one embodiment of the host computer.

One embodiment of host computer 110 is illustrated in FIG. 6. Host computer 110 may include at least one central processing unit (CPU) 760 which couples to host bus 762. The CPU 760 may be realized by any of various types of processor. For example, CPU 760 may be an x86 processor (e.g., a Pentium class processor), a PowerPC processor, or a RISC processor from the SPARC family.

A memory medium 766, typically including RAM and referred to as main memory, is coupled to the host bus 762 by means of a memory controller 764. The main memory 766 may store program instructions executable by the CPU 760. The main memory may also store operating system software, as well as other software for operation of host computer 110.

The host bus 762 may be coupled to an expansion bus 770 by means of a bus controller 768 (also referred to herein as bus bridge logic). The expansion bus 770 may be a PCI (Peripheral Component Interconnect) expansion bus, although busses of other types can be used. The expansion bus 770 may include slots to support communication with various devices such as the controller platform 120, video display card 780, hard drive controller 782, and I/O devices (not shown) such as a keyboard, mouse and speakers.

Numerous variations and modifications will become apparent to those skilled in the art once the above disclosure is fully appreciated. It is intended that the following claims be interpreted to embrace all such variations and modifications.

What is claimed is:

1. A computer implemented method comprising:
    utilizing a computer to perform:
        receiving user input specifying desired characteristics for a motion controller, wherein the desired characteristics specified by the user input include supervisory control functions and trajectory generation functions;
        automatically generating a motion controller program that realizes the desired characteristics for the motion controller based on the user input, wherein said automatically generating the motion controller program comprises automatically generating program instructions implementing the supervisory control functions and the trajectory generation functions;
        downloading the motion controller program to a hardware platform;
        wherein the hardware platform executes the motion controller program to implement the motion controller having the desired characteristics, and wherein the motion controller program executes on the hardware platform to receive application level commands from a motion control application and generate corresponding control signals for at least one drive unit;
        automatically generating an application programming interface (API) corresponding to the motion controller program, wherein the API provides a software interface to the motion controller program executing on the hardware platform for applications running on a host computer.

2. The method of claim 1, wherein the desired characteristics specified by the user input include control loop processing functions, and wherein said automatically generating the motion controller program further comprises automatically generating program instructions implementing the control loop processing functions.

3. The method of claim 1, further comprising:
    utilizing the computer to perform:
        compiling the motion controller program into executable code;
        wherein said downloading comprises downloading the executable code to the hardware platform.

4. The method of claim 1,
    wherein said automatically generating the motion controller program comprises generating the motion controller program without manual user input specifying code of the motion controller program during said automatically generating.

5. A computer-readable memory medium comprising program instructions for automatically generating a motion controller, wherein the program instructions are executable by a processor to implement:
    receiving information from a user regarding characteristics of the motion controller, wherein the desired characteristics specified by the user input include supervisory control functions and trajectory generation functions;
    automatically generating a motion controller program, wherein the motion controller program is executable to implement the motion controller according to said characteristics, wherein the motion controller program is automatically generated without manual user coding of the motion controller program, and wherein said automatically generating the motion controller program comprises automatically generating program instructions implementing the supervisory control functions and the trajectory generation functions, and wherein the motion controller program executes on the hardware platform to receive application level commands from a motion control application and generate corresponding control signals for at least one drive unit;
    downloading executable code corresponding to the motion controller program to a target platform to configure the target platform as the motion controller
    automatically generating an application programming interface (API) corresponding to the motion controller program, wherein the API provides a software interface to the motion controller program executing on the target platform for applications running on a host computer.

6. The computer-readable memory medium of claim 5, wherein the information from the user regarding characteristics of the motion controller comprises at least one of:
    type of target platform;
    axes type;
    motion I/O devices;
    functionality; and
    additional I/O devices.

7. The computer-readable memory medium of claim 5, wherein the information from the user regarding characteristics of the motion controller comprises at least two of:
    type of target platform;
    axes type;
    motion I/O devices;
    functionality; and
    additional I/O devices.

8. The computer-readable memory medium of claim 5, wherein the information from the user regarding characteristics of the motion controller comprises:
    axes type;
    motion I/O devices.

9. The computer-readable memory medium of claim 5, wherein the characteristics specified by the user further include
    control loop processing functions; and
    wherein said automatically generating the motion controller program comprises automatically generating program instructions implementing the control loop processing functions.

10. The computer-readable memory medium of claim 5, wherein the target platform includes a processor and memory, wherein said downloading transfers the executable code from a host computer to the memory, wherein the processor is configured to execute the executable code from the memory.

11. The computer-readable memory medium of claim 5, wherein the target platform includes a field programmable gate array (FPGA), wherein at least a portion of the executable code is downloaded to the FPGA.

12. The computer-readable memory medium of claim 5, wherein the motion controller program is a graphical program that comprises a plurality of interconnected nodes that visually indicate functionality of the graphical program.

13. A method comprising:
receiving user input specifying requirements for a motion control program, wherein the requirements specified by the user input include supervisory control functions and trajectory generation functions;
automatically creating a customized motion control program based on the user input, wherein the customized motion control program is executable to fulfill the requirements, wherein said automatically creating the customized motion control program comprises automatically generating program instructions implementing the supervisory control functions and the trajectory generation functions;
downloading executable code corresponding to the customized motion control program to a target platform;
executing the executable code on the target platform, wherein the target platform operates as a motion controller by executing the executable code, and wherein the executable code executes on the hardware platform to receive application level commands from a motion control application and generate corresponding control signals for at least one drive unit;
automatically generating an application programming interface (API) corresponding to the motion controller program, wherein the API provides a software interface to the motion controller program executing on the target platform for applications running on a host computer.

14. A system for creating a custom motion controller, the system comprising:
a controller platform; and
a host computer coupled to the controller platform, wherein the host computer is operable to:
receive user input specifying desired functionality of the motion controller, wherein the desired functionality specified by the user input includes supervisory control functions and trajectory generation functions;
automatically generate a motion controller program to implement the motion controller based on the user input specifying the desired functionality of the motion controller, wherein said automatically generating the motion controller program comprises automatically generating program instructions implementing the supervisory control functions and the trajectory generation functions;
create executable code corresponding to the motion controller program; and
download the executable code corresponding to the motion controller program to the controller platform, wherein the controller platform operates as the motion controller by executing the executable code, and wherein the executable code executes on the controller platform to receive application level commands from a motion control application and generate corresponding control signals for at least one drive unit;
automatically generate an application programming interface (API) corresponding to the motion controller program, wherein the API provides a software interface to the motion controller program executing on the controller platform for applications running on a host computer.

15. The system of claim 14, further comprising:
one or more drive units and one or more input or output devices connected to the controller platform;
one or more motors connected to the one or more drive units; and
one or more sensors connected to the controller platform and the one or more drive units;
wherein characteristics of the controller platform, each drive unit, each motor, and each sensor are specified by user input to the host computer.

16. The system of claim 14, wherein the user input further specifies control loop processing functions, and wherein to automatically generate the motion controller program, the program instructions are further executable to automatically generate program instructions implementing the control loop processing functions.

17. The method of claim 1, wherein the motion controller program is a graphical program that comprises a plurality of interconnected nodes that visually indicate functionality of the graphical program.

18. The method of claim 13, wherein the motion control program is a graphical program that comprises a plurality of interconnected nodes that visually indicate functionality of the graphical program.

19. The system of claim 14, wherein the motion controller program is a graphical program that comprises a plurality of interconnected nodes that visually indicate functionality of the graphical program.

20. The computer-readable memory medium of claim 5, wherein the implemented supervisory control functions comprise system initialization, event handling, and fault detection.

\* \* \* \* \*